Figures 1, 2:
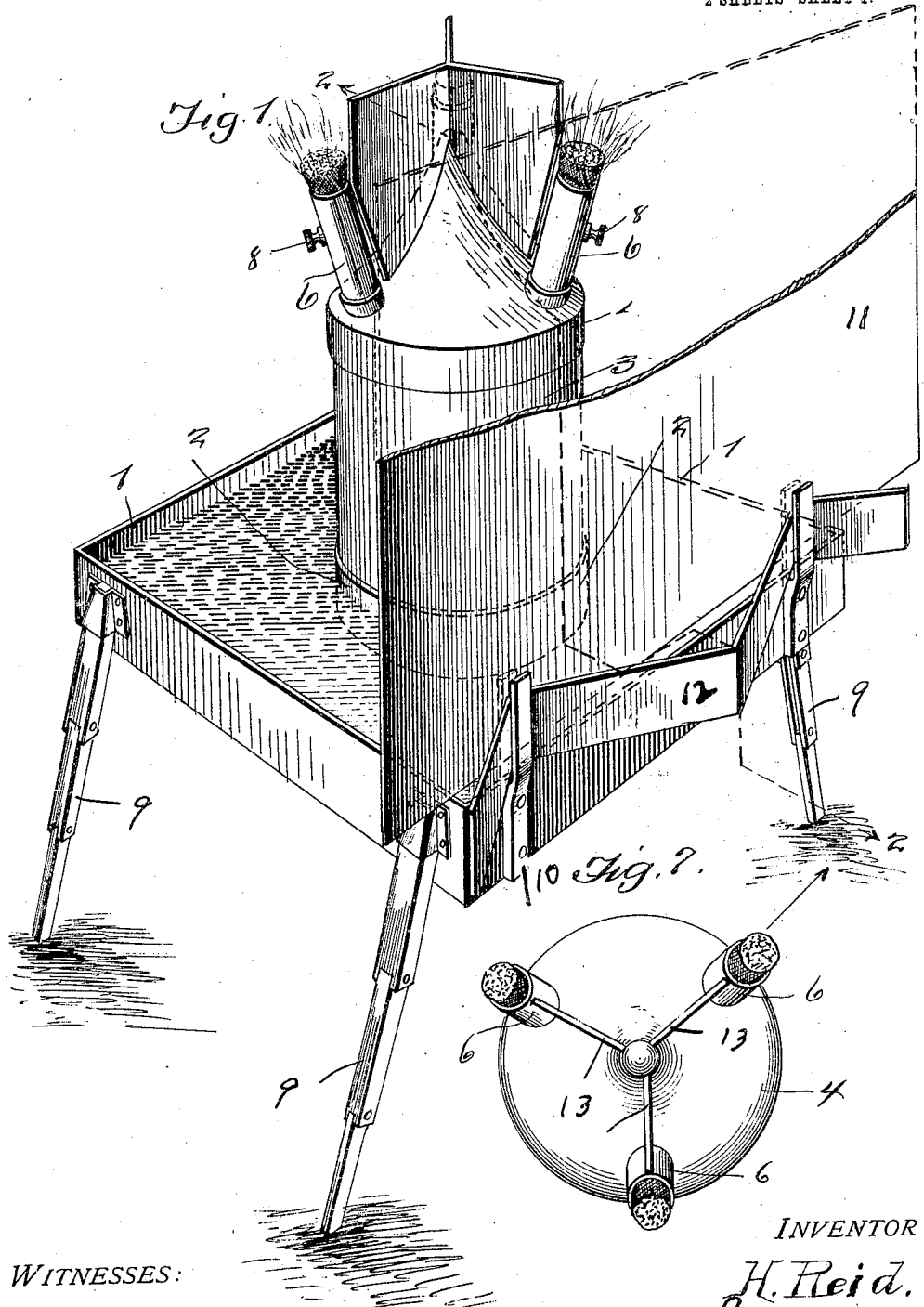

No. 822,388. PATENTED JUNE 5, 1906.
H. REID.
INSECT TRAP.
APPLICATION FILED FEB. 21, 1906.

2 SHEETS—SHEET 1.

WITNESSES:
R. A. Boswell.
K. G. Whitcomb.

INVENTOR
H. Reid.
BY Swift & Co.
his Attorneys

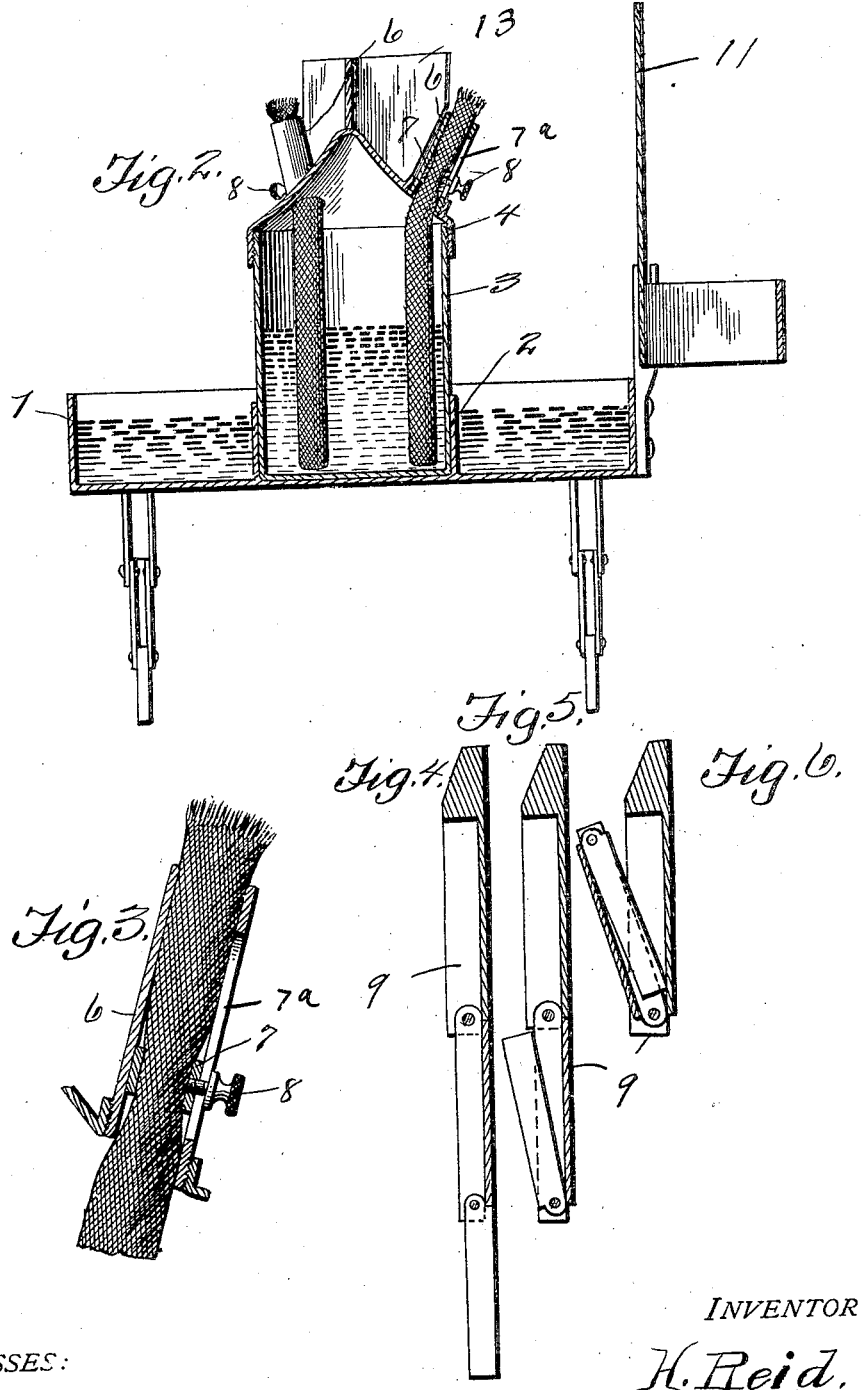

UNITED STATES PATENT OFFICE.

HENRY REID, OF MERIDIAN, OKLAHOMA TERRITORY.

INSECT-TRAP.

No. 822,388.     Specification of Letters Patent.     Patented June 5, 1906.

Application filed February 21, 1906. Serial No. 302,299.

*To all whom it may concern:*

Be it known that I, HENRY REID, a citizen of the United States, residing at Meridian, in the county of Logan and Territory of Oklahoma, have invented a new and useful Insect-Trap; and I do hereby declare the following to be a full, clear, and exact description of the invention, such as will enable others skilled in the art to which it appertains to make and use the same.

The invention relates to insect-traps, and has for its object to provide a simple, inexpensive, and durable device of this character which can be set out in the field, lighted, and which will attract injurious insects by its light, which will burn off their wings, after which they will fall into the pan of water below and be drowned.

In the drawings, Figure 1 is a perspective view of my invention, part of the fender being shown in dotted lines. Fig. 2 is a sectional view on line 2 2 of Fig. 1. Fig. 3 is a detail sectional view of one of the wicks and casing. Figs. 4, 5, and 6 are detail views of the foldable legs. Fig. 7 is a top plan view of the wicks and webbing.

Referring to the drawings, 1 designates a pan or other suitable vessel adapted to retain water, said pan having a central socket 2, adapted to receive and frictionally hold an oil-can 3. The can 3 is provided with a screw-threaded top 4, which is provided with a plurality of screw-threaded apertures which are adapted to receive screw-threaded cylindrical casings 6, in which are inserted wicks which connect with the oil within the can. The casings 6 are provided with inner collars 7, which engage the wicks and which render them slidable within said casings. A narrow slot 7ª is provided in each casing, by which a thumb-screw 8 engages the collars 7 and slides the same, as will be readily understood.

The pan 1 is supported by foldable legs 9, by which the device may be raised or lowered according to the height of the growing crop in which the trap is set. The foldable legs 9 are composed of a plurality of sections, each section being smaller than the upper section, whereby the sections can be folded, the smaller into the next larger section, as clearly shown in Figs. 4, 5, and 6. A pair of clips 10 are provided for the reception of a fender 11, which faces the wind for the purpose of preventing the lights from being blown out. The trap is provided with a handle or grip 12. Between each wick a webbing 13 is provided, which will prevent the insects from passing between the lights and which will have a tendency to conduct them to the light.

The wicks are inclined for the purpose of causing the insects to drop directly into the water below when their wings are burned off.

What I claim is—

1. An insect-exterminator, comprising a pan partly filled with water, an oil-can seated in the center of said water, said oil-can being provided with a plurality of burners, said burners being set at an outward inclination, whereby wingless insects will fall free from obstruction, directly into the water below, substantially as described.

2. An insect-trap, comprising a rectangular pan, having a liquid therein, burners mounted in said pan, clips mounted on one side of said pan, and a longitudinal fender mounted in said clips and adapted to shield said burners from the wind.

In testimony whereof I have hereto affixed my signature in the presence of two witnesses.

HENRY REID.

Witnesses:
    L. J. GILBERT,
    W. M. STEWARD.